3,215,680
POLYMERIC COMPOSITION AND PROCESS FOR PREPARING THE SAME
Edwin R. Kolodny, Stamford Conn., assignor to American Cyanamid Company, Stamford, Conn., a corporation of Maine
No Drawing. Filed Apr. 12, 1962, Ser. No. 186,849
12 Claims. (Cl. 260—89.7)

This invention relates to a process for preparing a polyacrylamide composition comprising polymerizing acrylamide in an aqueous medium in the presence of a catalytic material and in the presence of from about 10% to about 80% by weight of a monovalent inorganic salt of an inorganic acid and drying the resulting polymeric composition so as to remove substantially all of the water from said polymeric composition, wherein said percentages by weight are based on the total weight of said acrylamide and said salt. More particularly this invention relates to a process for preparing a high molecular weight polymer of acrylamide which may be dried without undergoing any significant polymeric degradation resulting in lowered molecular weights and which product has superior dispersibility and solubility characteristics.

One of the objects of the present invention is to produce an acrylamide polymeric composition containing from about 10% to about 80% by weight of a monovalent inorganic salt of an inorganic acid which in the dry state has enhanced dispersibility and solubility characteristics. A further object of the present invention is to produce an acrylamide polymer composition which may be dried to a substantially water free state without causing any degradation of the polymer. These and other objects of the present invention will be discussed in greater detail hereinbelow.

The processes for preparing polymers of acrylamide are numerous and are also well known in the art. When high molecular weight polymers of acrylamide are prepared in aqueous media, difficulties are frequently encounted in extracting the polymeric material from the aqueous medium so as to produce a substantially dry polymeric material which has not undergone any significant degradation in molecular weight and which has the desired characteristics of redispersibility and water-solubility. These polymeric compositions, generally speaking, have utility in a great plurality of fields such as in flocculation, settling of mineral ores, filtration, oil well flooding, papermaking and the like. Ordinarily in the preparation of a polymer of acrylamide, small percentages of acrylamide monomer, i.e., about 5% to about 30% by weight based on the total weight of acrylamide aqueous solution, are utilized. Conventional polymerization catalysts are used as a means to achieve this polymerization reaction. As the molecular weight increases, the polymeric material becomes a tough, rubbery gel which is dried generally only with great difficulty. Even when drying is accomplished it is frequently found that the molecular weight has undergone some significant measure of degradation which results in lowered performance of the polymeric material and its various uses. It is therefore highly desirable to develop a process that eliminates the difficulty in drying the polymeric material without having any adverse effect on the molecular weight, the redispersibility and the solubility. The instant invention permits drying without experiencing appreciably any substantial molecular weight degradation. The essence of the present invention then resides in the interrelationship between the addition of from about 10% to about 80% by weight of a monovalent inorganic salt of an inorganic acid during the polymerization reaction and the subsequent drying of the modified polymeric material.

Among the monovalent inorganic bases which may be used to prepare the inorganic salts used in the present invention are sodium hydroxide, potassium hydroxide, lithium hydroxide, ammonium hydroxide and the like. Among the inorganic acids used to form these salts are hydrochloric acid, sulfuric acid, phosphoric acid, nitric acid and the like. One could utilize other hydrohalic acids such as hydroiodic acid, hydrobromic acid and hydrofluoric acid but costs of these materials make their use less advantageous than the less expensive counterparts mentioned hereinabove. More precisely, one can use in the practice of the process of the present invention any of the following salts: sodium chloride, sodium nitrate, sodium sulfate, sodium phosphate, potassium chloride, potassium sulfate, potassium nitrate, potassium phosphate, ammonium chloride, ammonium sulfate, ammonium nitrate, ammonium phosphate, lithium sulfate and the like. Obviously these salts may be used either singly or in combination with one another. It is further preferred that the amount of the salt used be varied between about 30% and 60% by weight based on the total weight of acrylamide and said salt. Wherever a salt is used as a part of a redox system for the catalytic polymerization of acrylamide, such salt is not calculated in amount within this stated range but instead is calculated in addition to this stated range. These salts which are used as a part of a redox catalyst system are different from the salt used from the class described hereinabove inasmuch as the redox salts are reactive and participate in an oxidation reduction polymerization type of chemical process whereas the added salts of the class described hereinabove are inert with respect to the polymerization reaction.

In the polymerization of acrylamide in keeping with the concept of the present invention, one may utilize any one of a great plurality of polymerization catalysts all of which are well known in the art. Illustrative of these catalysts are tertiarybutylhydroperoxide, ditertiarybutylperoxide, benzoyl peroxide, hydrogen peroxide, ammonium persulfate, potassium persulfate, sodium persulfate, sodium chlorate, potassium chlorate, ammonium chlorate, sodium perborate, potassium perborate, ammonium perborate, sodium percarbonate, potassium percarbonate, ammonium percarbonate, and the like. As a redox system one may use such catalysts comprising an oxygen containing compound and a reducing agent such as the combination of sodium persulfate with sodium bisulfite, sodium persulfate with potassium bisulfite, potassium persulfate with sodium bisulfite, potassium persulfate with potassium bisulfite, ammonium persulfate with sodium thiosulfate and the like. When higher molecular weight polymers are desired a combination of an alkali metal bromate and an alkali metal sulfite or an alkali persulfate with a tertiary amine can be used. These latter catalytic combinations are described in significant detail in the U.S. Patent 3,002,960. As a general rule, the catalysts used in the present invention will be used in conventional catalytic amounts such as between about 0.001% and 5% by weight based on the weight of the dry monomer and preferably from about 0.01% and 0.5% by weight, same basis.

The polymerization step of the present invention is carried out by heating the aqueous solution of acrylamide monomer plus inert salt and catalyst at a temperature sufficient to activate the catalyst and to polymerize the acrylamide monomer. Such temperatures as 20° C. to 100° C. may be used but preferably temperatures from about 30° C. to about 60° C. The polymerization is carried out until substantially all of the monomer is converted to polymer. The molecular weight may be varied over a very substantial range and may be as low as a few thousand such as 20,000–50,000 or may be exceedingly high in molecular weight such as 2 million, 10 million, 20 million and even higher. The method for determining the molecular weight of the lower values of polymeric materials can be achieved by any one of a number of different known techniques such as light scattering, intrinsic viscosities and the like. The term "intrinsic viscosity" is a value, expressed in deciliters per gram of polymer, which is proportional to the effective hydrodynamic volume or size of the polymer in solution at about zero concentration, i.e., the infinite dilution. See J. Polymer Science, vol. 5, pages 745–7 (1950). This value must be distinguished from ordinary viscosity as measured in centipoises since the latter term expresses the relationship of the resistance to flow of the liquid being compared to that of water at 68.6° F.

The intrinsic viscosity of a polyacrylamide is determined from the rate of flow of its dilute solutions in solvents such as 0.1 normal aqueous sodium chloride or normal aqueous sodium nitrate at 30° C. and at several concentrations. The ratio of the viscosity of the solution of the polymer at any one concentration to the viscosity of the solvent, as measured at 30° C., is the relative viscosity ($N_r$) at this concentration. This value minus one is equal to the specific viscosity ($N_{sp}$). The intrinsic viscosity is determined by plotting the ratio of the specific viscosity to the concentration of polymer against the concentration of the polymer and extrapolating the resultant plot to zero concentration. Ordinary viscosities are of course measured directly in standard instruments such as the capillary viscometer.

Molecular weight studies based on light scattering and other indicia have shown that the weight average molecular weight of a polyacrylamide is expressed accurately by the formula.

Intrinsic viscosity in deciliters per gram = $3.73 M^{0.66} \times 10^{-4}$ wherein M is the weight average molecular weight.

The high molecular weight polymers may also be determined in numerical value by the light scattering method as outlined in the "Principles of Polymer Chemistry," P. J. Flory, Cornell University Press, 1953, pages 256–316. These molecular weight determinations by the light scattering method are generally referred to as weight average molecular weight as contrasted with number average molecular weight which is the test generally applied to lower molecular weight polymers.

When the polymerization step has been completed the aqueous solution of the composition comprising the polymeric material and the salt is then dried by any one of a plurality of drying techniques so as to remove substantially all of the water from the composition. One may use oven drying, conveyor belt drying, drum drying or precipitation technique of which a plurality are well known in the art. It is preferred in the practice of the process of the present invention to utilize the drum drying technique for overall economic advantage. In applying the heat-drying technique including drum drying, one may heat the aqueous solution of the mixture of polymer and salt at a temperature varying between about 40° C. and 120° C. and preferably from about 60° C. to 90° C. at atmospheric pressure. Vacuum dehydration can readily be used in the practice of the process of the present invention in which event temperatures below those set forth hereinabove could be utilized such as 0–30° C.

In order that the concept of the present invention may be more completely understood the following examples are set forth in which all parts are parts by weight unless otherwise indicated. These examples are set forth primarily for the purpose of illustration and should not be interpreted as a limitation on the case except as indicated in the appended claims.

*Example 1*

Into a suitable reaction vessel equipped with thermometer, stirrer, inert gas inlet and outlet tubes there is introduced 7 parts of monomeric acrylamide, 3 parts of sodium sulfate, and 89.637 parts of water. The charge is heated to about 50° C. under a blanket of an inert gas atmosphere of nitrogen and carbon dioxide. Thereupon a 1% sodium bromate solution amounting to 0.145 part of sodium bromate is then stirred in followed by a 1% aqueous solution of ammonium persulfate amounting to 0.169 part and finally by a 1% aqueous solution of sodium sulfite amounting to 0.049 part. The polymerization begins almost immediately. The aqueous solution thickens significantly as the polymerization continues. The temperature rises to about 65° C. where it is held for about 6 hours. The viscous polymer solution amounting to a gel is then discharged from the reactor and dried at a drum temperature of 165° C. until substantially all of the water is removed. The resulting polymeric composition is a dry, powdery material which is readily redispersed in water and which exhibits excellent solubility characteristics.

*Example 2*

Example 1 is repeated in substantially all details except in the place of the sodium sulfate there is substituted an equal amount of sodium chloride. Comparable results are achieved.

*Example 3*

Into a suitable reaction vessel equipped as in Example 1, there is introduced 7.2 parts of monomeric acrylamide, 4.8 parts of ammonium sulfate and 87.472 parts of deionized water. With constant stirring the charge is heated to about 40° C. under an inert atmosphere of nitrogen gas. There is then added 0.072 part of a 1% aqueous solution of sodium bromate followed by 0.144 part of a 1% aqueous solution of ammonium persulfate followed by the addition of 0.072 part of a 1% aqueous solution of sodium sulfite. The polymerization reaction initiates almost immediately. The solution thickens as polymerization proceeds. The temperature rises to about 58° C. The temperature is maintained between this peak exothermic value (58° C.) and about 65° C. for approximately 5–6 hours. The viscous polymer solution (gel) is then discharged from the reactor and drum dried as in Example 1.

*Example 4*

Into a suitable reaction vessel as in Example 1 there is introduced 6.947 parts of monomeric acrylamide, 0.354 part of glacial acrylic acid, 2.977 parts of anhydrous sodium sulfate dissolved in 89.361 parts of deionized water. The temperature of the solution is adjusted to 25° C. Thereupon 0.146 part of a 1% aqueous solution of sodium bromate is added followed by 0.167 part of a 1% aqueous solution of ammonium persulfate and finally by 0.048 part of a 1% aqueous solution of sodium sulfite. The polymerization is conducted under a blanket of an inert atmosphere of carbon dioxide. The polymerization initiates soon after the catalyst addition and the temperature rises to about 40° C. whereupon external heat is applied to raise and maintain the temperature at about 65° C. for about 5 hours. The viscous polymer solution is then discharged from the reactor and is drum dried substantially in keeping with the procedure outlined in Example 1.

The polyacrylamides of the instant invention are expected to have utility as flocculating agent for settling a wide variety of materials. They may be used as the sole flocculating agent or in conjunction with conventional flocculating agents to clarify water for domestic or industrial purposes, and in the flocculation, settling, thickening and dewatering processes used on flotation concentrates and tailings, liquors from leaching minerals and ore materials with water or solutions of acids, alkalies, cyanides, etc., chemical precipitates including fine insoluble calcium, magnesium and uranium salts, various industrial waste products including those from electroplating, paper processing, deinking, tanning, and food processing, also mine wastes, and effluents from washeries and plants treating sand and gravel, cement materials, iron ores, coal, and phosphate rock, also textile wastes, domestic and industrial sewage, foundry wastes, also suspensions employed in processing various industrial minerals such as clay fillers, coating materials, asbestos, metallic oxides, pigments and the like.

A polyacrylamide of this invention improves the filtration rate when the above-listed and like suspensions are dewatered by filtration methods. In addition, the handling of filter cakes and dewatered products is facilitated in that these products are firm and can be removed readily from filtration equipment.

The polyacrylamides may be used alone or employed in conjunction with conventional settling agents such as alums, aluminum sulfate, calcium chloride, lime iron salts, glues, gelatines, starches, cellulose derivatives, and the like. The polyacrylamides are particularly useful for settling and filtration of mineral suspensions and ore pulps which contain finely divided predominantly non-argillaceous materials.

The polyacrylamides and their copolymers with other vinyl monomers may find utility as a general thickening agent, a pigment retention agent in papermaking applications, a binder in ceramic applications, as an agent to promote greater freeness in papermaking applications.

The expression "substantially dry or substantially free of water" is intended to encompass those compositions which contain comparatively small amounts of water such as traces or even small percentages such as about 3–5% since the feel of the dry powdery material will, even under these conditions, have the apparent characteristic of dryness. Under the ordinary conditions of preparation the polymeric material will not be absolutely dry.

In the drum drying step, the temperature of the drum itself is maintained at about 100° C. to about 180° C. and preferably at about 150–170° C. at atmospheric pressure and may be calculated downwardly if vacuum dehydration is utilized at the same time. The temperature of the polymeric solution, however, is not quite as elevated and instead is varied generally between about 40° C. and 120° C. as is disclosed hereinabove.

The process of the present invention permits the low cost conversion of high molecular polymers of acrylamide solutions into dry powders. At the same time the presence of the diluent salt during polymerization confers to the final dry product exceptionally good dispersibility and solubility characteristics heretofore not previously obtained with high molecular weight polymers of acrylamide. This characteristic is espectially desirable in those applications such as flocculation of mineral slurries or pigment retention in papermaking, where stock solutions of the product are prepared because of the tendency of ordinary polyacrylamide to "gum-up" greatly which extends solution time. The presence of the diluent salt further serves to protect the polymer against severe degradation during the drum-drying operation. Still further the presence of the diluent salt greatly increases the rate of drum drying and facilitates the release of the sheet from the hot drum. In certain instances the diluent salts may be added after polymerization of the acrylamide is completed but difficulties in mixing said diluent salt with the polymeric solution are present especially when the polymeric solution is so viscous as to prevent obtaining of homogeneity which would result in a heterogeneous mixture of salt and polymer and would not provide the protection against degradation desired.

A further alternative approach to the process of the present invention resides in the use of acrylamide sulfate as a starting material which when dissolved in water may be neutralized to the extent required by such bases as sodium hydroxide, potassium hydroxide, sodium carbonate and the like. The water soluble monovalent inorganic salt of an inorganic acid is formed in situ in an amount calculated to fall between about 10% and 80% by weight same basis as above. The free monomeric acrylamide may then be polymerized as above and dried.

Although the concept of the present invention was directed primarily to the homopolymerization of acrylamide, other water soluble polymers of acrylamide may be prepared in accordance with the concept of the present invention wherein the copolymer produced contains in addition to acrylamide up to about 50 mole percent of such other vinyl monomers as methacrylamide, acrylic acid, methacrylic acid, vinyl benzyl ammonium compounds, vinyl benzene sulfonic acid and the like.

I claim:
1. A process for producing a dry water-soluble polymeric composition of matter comprising polymerizing acrylamide in an aqueous medium in the presence of a polymerization catalyst and in the presence of from about 10% to about 80% by weight of a water-soluble monovalent inorganic salt of an inorganic acid and drying the resulting polymeric composition so as to remove substantially all of the water from said polymeric composition, wherein said percentages by weight are based on the total weight of said acrylamide and said salt wherein said salt is inert with respect to the polymerization reaction.

2. A process for producing a dry water-soluble polymeric composition of matter comprising polymerizing acrylamide in an aqueous medium in the presence of a polymerization catalyst and in the presence of from about 30% to about 60% by weight of a water-soluble monovalent inorganic salt of an inorganic acid and drying the resulting polymeric composition so as to remove substantially all of the water from said polymeric composition, wherein said percentages by weight are based on the total weight of said acrylamide and said salt wherein said salt is inert with respect to the polymerization reaction.

3. A process for producing a dry water-soluble polymeric composition of matter comprising polymerizing acrylamide in an aqueous medium in the presence of a polymerization catalyst and in the presence of from about 10% to about 80% by weight of a water-soluble monovalent inorganic salt of an inorganic acid and drum drying the resulting polymeric composition so as to remove substantially all of the water from said polymeric composition, wherein said percentages by weight are base on the total weight of said acrylamide and said salt wherein said salt is inert with respect to the polymerization reaction.

4. A process for producing a dry water-soluble polymeric composition of matter comprising polymerizing acrylamide in an aqueous medium in the presence of a polymerization catalyst and in the presence of from about 30% to about 60% by weight of a water-soluble monovalent inert inorganic salt of an inorganic acid and drum drying the resulting polymeric composition so as to remove substantially all of the water from said polymeric composition, wherein said percentages by weight are based on the total weight of said acrylamide and said salt wherein said salt is inert with respect to the polymerization reaction.

5. A process for producing a dry water-soluble polymeric composition of matter comprising polymerizing acrylamide in an aqueous medium in the presence of a polymerization catalyst and in the presence of from about 10% to about 80% by weight of sodium sulfate and drying the resulting polymeric composition so as to remove substantially all of the water from said polymeric composition, wherein said percentages by weight are based on the total weight of said acrylamide and said salt.

6. A process for producing a dry water-soluble polymeric composition of matter comprising polymerizing acrylamide in an aqueous medium in the presence of a polymerization catalyst and in the presence of from about 10% to about 80% by weight of sodium chloride and drying the resulting polymeric composition so as to remove substantially all of the water from said polymeric composition, wherein said percentages by weight are based on the total weight of said acrylamide and said salt.

7. A process for producing a dry water-soluble polymeric composition of matter comprising polymerizing acrylamide in an aqueous medium in the presence of a polymerization catalyst and in the presence of from about 30% to about 60% by weight of sodium sulfate and drying the resulting polymeric composition so as to remove substantially all of the water from said polymeric composition, wherein said percentages by weight are based on the total weight of said acrylamide and said salt.

8. A process for producing a dry water-soluble polymeric composition of matter comprising polymerizing acrylamide in an aqueous medium in the presence of a polymerization catalyst and in the presence of from about 30% to about 60% by weight of sodium sulfate and drum drying the resulting polymeric composition so as to remove substantially all of the water from said polymeric composition, wherein said percentages by weight are based on the total weight of said acrylamide and said salt.

9. A process for producing a dry water-soluble polymeric composition of matter comprising polymerizing acrylamide in an aqueous medium in the presence of a polymerization catalyst and in the presence of from about 30% to about 60% by weight of sodium chloride and drum drying the resulting polymeric composition so as to remove substantially all of the water from said polymeric composition, wherein said percentages by weight are based on the total weight of said acrylamide and said salt.

10. A substantially dry, water-soluble composition of matter comprising the product produced according to the process of claim 1.

11. A substantially dry, water-soluble composition of matter comprising the product produced according to the process of claim 2.

12. A substantially dry, water-soluble composition of matter comprising the product produced according to the process of claim 5.

References Cited by the Examiner

UNITED STATES PATENTS

| | | | |
|---|---|---|---|
| 2,486,191 | 10/49 | Minsk et al. | 260—89.7 |
| 3,021,298 | 2/62 | Rakowitz | 260—41 |
| 3,065,193 | 11/62 | Volk | 260—29.6 |

JOSEPH L. SCHOFER, *Primary Examiner.*

J. R. LIBERMAN, *Examiner.*